(12) United States Patent
Zhou

(10) Patent No.: US 10,642,475 B2
(45) Date of Patent: May 5, 2020

(54) INFORMATION PRESENTATION METHOD AND TERMINAL DEVICE

(71) Applicant: Tencent Technology (Shenzhen) Company Limited, Shenzhen (CN)

(72) Inventor: Bin Zhou, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 16/162,201

(22) Filed: Oct. 16, 2018

(65) Prior Publication Data

US 2019/0073106 A1 Mar. 7, 2019

Related U.S. Application Data

(63) Continuation-in-part of application No. PCT/CN2017/082695, filed on May 2, 2017.

(30) Foreign Application Priority Data

May 3, 2016 (CN) .......................... 2016 1 0286555

(51) Int. Cl.
*G06F 3/048* (2013.01)
*G06F 3/0486* (2013.01)
(Continued)

(52) U.S. Cl.
CPC .......... *G06F 3/0486* (2013.01); *G06F 3/0483* (2013.01); *G06F 3/0485* (2013.01); *G06F 3/0488* (2013.01); *G06F 3/04883* (2013.01)

(58) Field of Classification Search
CPC .............................. G06F 3/0486; G06F 3/0483
(Continued)

(56) References Cited

U.S. PATENT DOCUMENTS

2014/0258846 A1* 9/2014 Shin .................... G06F 17/2247
715/234

FOREIGN PATENT DOCUMENTS

| CN | 103455279 A | 12/2013 |
| CN | 104125338 A | 10/2014 |

(Continued)

OTHER PUBLICATIONS

Tencent Technology, ISRWO, PCT/CN2017/082695, dated Jun. 28, 2017, 6 pgs.

(Continued)

*Primary Examiner* — Andrey Belousov
(74) *Attorney, Agent, or Firm* — Morgan, Lewis & Bockius LLP

(57) ABSTRACT

A device displays a first page of a set of related content on the display. While displaying the first page on the display, the device detects an operation action performed by a user for switching from the first page to a second page of the set of related content. In response to detecting the operation action performed by the user: the device slides the first page of the set of related content in a first direction off the display, the device slides additional information that is distinct from the second page of the set of related content onto the display in the first direction, while the first page is sliding off the display, and the device displays the second page of the set of related content after at least a portion of the additional information is displayed on the display for at least a preset threshold amount of time.

15 Claims, 4 Drawing Sheets

(51) Int. Cl.
*G06F 3/0488* (2013.01)
*G06F 3/0485* (2013.01)
*G06F 3/0483* (2013.01)

(58) Field of Classification Search
USPC .......................................................... 715/769
See application file for complete search history.

(56) References Cited

FOREIGN PATENT DOCUMENTS

| | | |
|---|---|---|
| CN | 104272220 A | 1/2015 |
| CN | 105955582 A | 9/2016 |

OTHER PUBLICATIONS

Tencent Technology, IPRP, PCT/CN2017/082695, dated Nov. 6, 2018, 5 pgs.

* cited by examiner

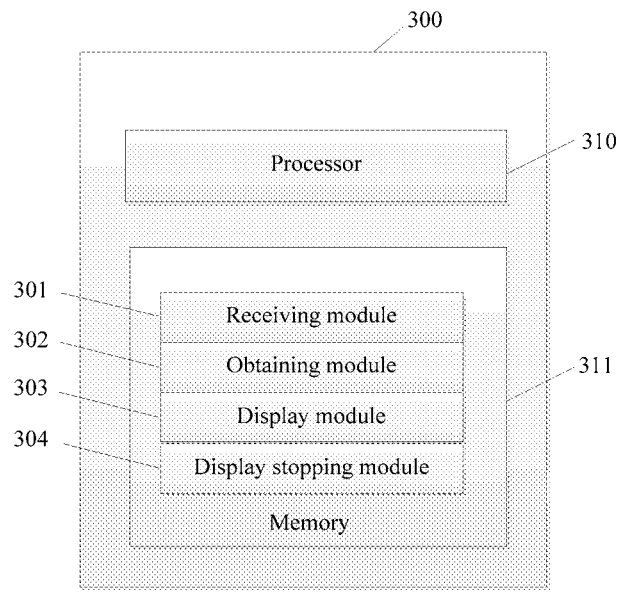
FIG. 3
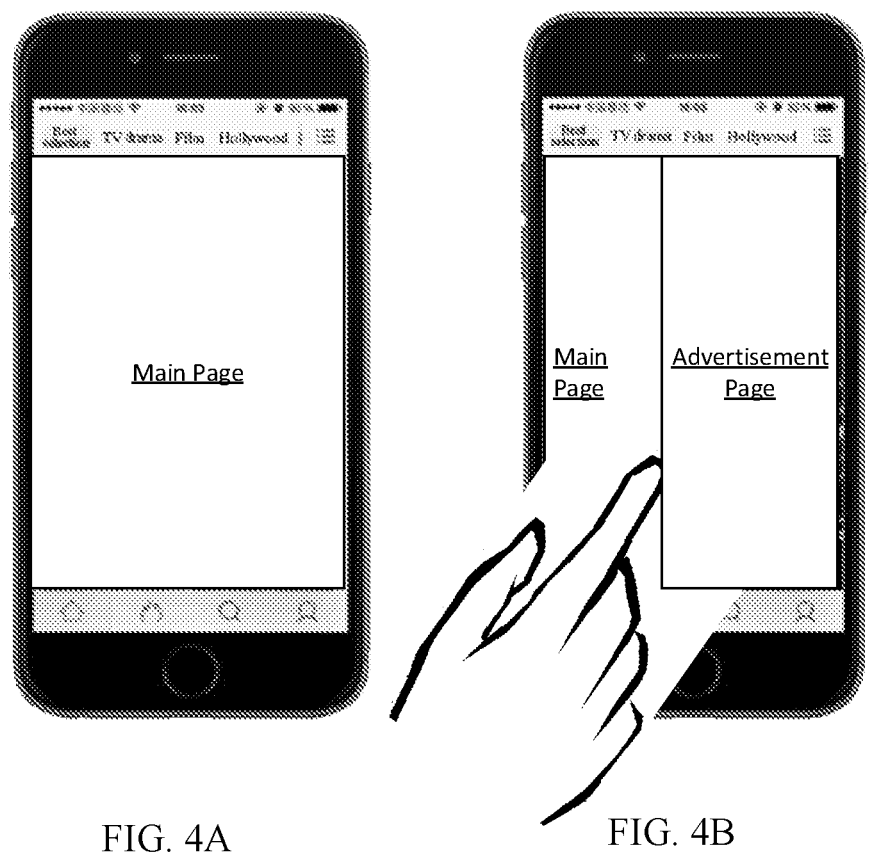
FIG. 4A
FIG. 4B

INFORMATION PRESENTATION METHOD AND TERMINAL DEVICE

PRIORITY CLAIMS AND RELATED APPLICATIONS

This application is a continuation-in-part application of PCT application number PCT/CN2017/082695, entitled "INFORMATION PRESENTATION METHOD AND TERMINAL DEVICE", filed with the Chinese Patent Office on May 2, 2017, which claims priority to Chinese Patent Application No. 201610286555.6, entitled "INFORMATION PRESENTATION METHOD AND TERMINAL DEVICE" filed with the Chinese Patent Office on May 3, 2016, all of which are incorporated by reference in their entirety.

FIELD OF THE TECHNOLOGY

The present disclosure relates to the field of Internet technologies, and in particular, to an information presentation method and a terminal device.

BACKGROUND OF THE DISCLOSURE

Currently, when a terminal device presents main information (for example, news content presented on a news client) of an application on a user interface, the user interface further presents corresponding additional information (for example, advertisement information and promotional information). The additional information may be displayed on the user interface in a form of a banner, a launch screen, an information flow, and the like. The presentation of the additional information is sometimes timed, and the user is not allowed to remove the display of the additional information until a preset time period has expired. There is a challenge in presenting the additional information in a manner that does not negatively impact the user's experience in interacting with the application and experience the main information of the application.

SUMMARY

Embodiments of the present disclosure provide an information display method, to improve information display efficiency and improve user experience when interacting with the application.

In one aspect, a method is performed at a device having one or more processors, memory, a display, and a touch-sensitive surface. The device displays a first page of a set of related content on the display. While displaying the first page of the set of related content on the display, the device detects an operation action performed by a user for switching from the first page to a second page of the set of related content. In response to detecting the operation action performed by the user: the device slides the first page of the set of related content in a first direction off the display, the device slides additional information that is distinct from the second page of the set of related content onto the display in the first direction, while the first page is sliding off the display, and the device displays the second page of the set of related content after at least a portion of the additional information is displayed on the display for at least a preset threshold amount of time.

According to a second aspect of the present disclosure, a computing device includes one or more processors, memory, a display, a touch-sensitive surface, and a plurality of instructions stored in the memory that, when executed by the one or more processors, cause the computing device to perform the aforementioned method.

According to a third aspect of the present disclosure, a non-transitory computer readable storage medium storing a plurality of instructions configured for execution by a computing device having one or more processors, the plurality of instructions causing the computing device to perform the aforementioned method.

Details of one or more embodiments of the present disclosure are provided in the following accompanying drawings and descriptions. Other features, objectives, and advantages of the present disclosure become clear in the specification, the accompanying drawings, and the claims.

In the foregoing technical solutions, a new additional information display manner is provided, so that display space of a terminal device is more effectively used to display main information and additional information, and information display efficiency is improved. In addition, a user can acquire the additional information within a waiting time of switching a page, thereby improving user experience. By improving the information presentation efficiency and providing more control on the presentation of information and interaction with the application, the device can be more energy efficient, e.g., by reducing user error when the user interacts with the device.

BRIEF DESCRIPTION OF THE DRAWINGS

To more explicitly explain technique solutions in embodiments of the present disclosure or the existing technology, drawings needed to be used in illustrating the embodiments in the present disclosure or the existing technology will be briefly introduced in the following. Apparently, the following drawings are only some embodiments of the present disclosure; persons skilled in the art can derive other drawings from the accompanying drawings without creative work.

FIG. 3 is a schematic structural diagram of a terminal device according to an embodiment of the present disclosure;

FIG. 4A to 4D are schematic diagrams of displaying additional information according to an embodiment of the present disclosure.

DESCRIPTION OF EMBODIMENTS

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments in the present disclosure without creative effects shall fall within the protection scope of the present disclosure.

The inventor of the present disclosure finds in a research process that as main information and corresponding additional information of an application are simultaneously displayed on a user interface of a terminal device, the size of a display area of the main information is reduced. In addition, the inventor of this application further finds in a research process that after performing an operation action of switching from a page to another page, a user usually needs to wait for a period of time before viewing the displayed second page. This is because an application client needs to take a period of time to run related code and read related data. Within the period of time taken to wait for display of the another page, the user can acquire no information.

Figure 1:
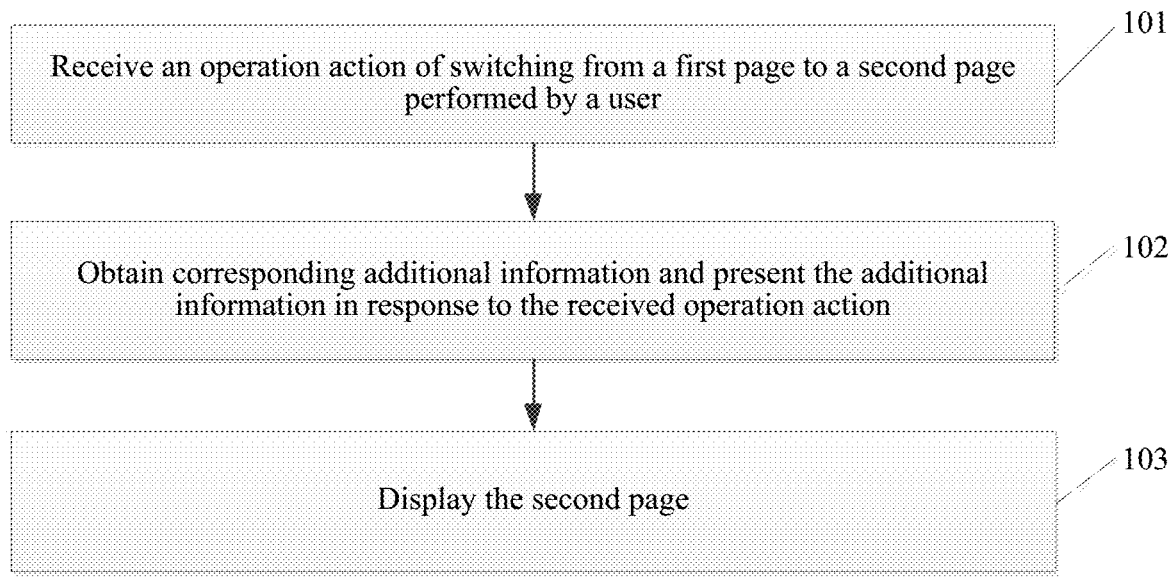
FIG. 1 is a flowchart of an information presentation method according to an embodiment of the present disclosure.

In view of this, an embodiment of the present disclosure provides an information display method. FIG. 1 is a flowchart of an information presentation method according to an embodiment of the present disclosure. The method is applied to an application client on a terminal device. As shown in FIG. 1, when an application client displays a first page, the method includes the following steps.

Step 101: Receive an operation action of switching from the first page (e.g., a main information page, such as a main index page for an information portal or media portal) to a second page (e.g., an adjacent page that includes a first category of information, such as an index page for a sub-category of the information porta or media portal) performed by a user.

In an embodiment of the present disclosure, the operation action performed by the user may be a slide operation on a touchscreen (e.g., a horizontal swipe gesture) of a terminal device. For example, when the user performs a slide operation from right to left on a main page of an application (e.g., the gesture starts from the right edge of the touch-screen), an operation of switching from the main page to a second page is performed. The second page corresponds to a page tag that is in a tag listing (e.g., a row of tabs or links in a menu that correspond to different pages of information) and that is on the right side of a tag of the main page.

In an embodiment of the present disclosure, the operation action performed by the user may further be a click on the touchscreen of the terminal device, and corresponds to an activation of the tag of the second page.

In an embodiment of the present disclosure, the operation action performed by the user may further be an operation gesture, for example, various actions performed by the user when the user holds the terminal device with a hand (for example, shaking, throwing, or rotating), or actions such as the user claps hands, pats a desk, stamps foots, shakes head, and nods. For example, when the user performs a shaking operation gesture from right to left, an operation of switching from the main page to the second page is performed. The second page corresponds to a page tag that is in a tag listing and that is on the right side of a tag of the main page. Various actions performed by the user when the user holds the mobile terminal with a hand may be detected by sensors on the terminal device (for example, a gravity acceleration sensor and a gyroscope). These sensors may sense gesture changes of the terminal device, and therefore can detect these actions. Alternatively, an intelligent device bound with the terminal device may detect various free actions such as the user claps hands, pats a desk, stamps foots, shakes head, and nods. The intelligent device bound with the terminal device may be a wearable device. The wearable device may be a portable device directly worn on the body or integrated with clothes or an accessory of the user, for example, an application watch, a wrist strap, glasses, and an anklet. The wearable device has a computing function, and may be connected to a terminal device, to implement data exchange with a terminal device.

Step 102: Obtain corresponding additional information and present the additional information in response to the received operation action.

In an embodiment of the present disclosure, the application client pre-stores a mapping relationship between a web page switching operation action and identifier information of corresponding additional information. After receiving the operation action for switching the first page to the second page, it may be determined, according to the mapping relationship, whether the operation action triggers to acquire and display additional information. Specifically, if the mapping relationship corresponding to the operation and action is stored, it is determined that the operation and action triggers to acquire and display the additional information. Otherwise, it is determined that the operation and action does not trigger to acquire and display the additional information, and the procedure of the method ends.

Figure 2:
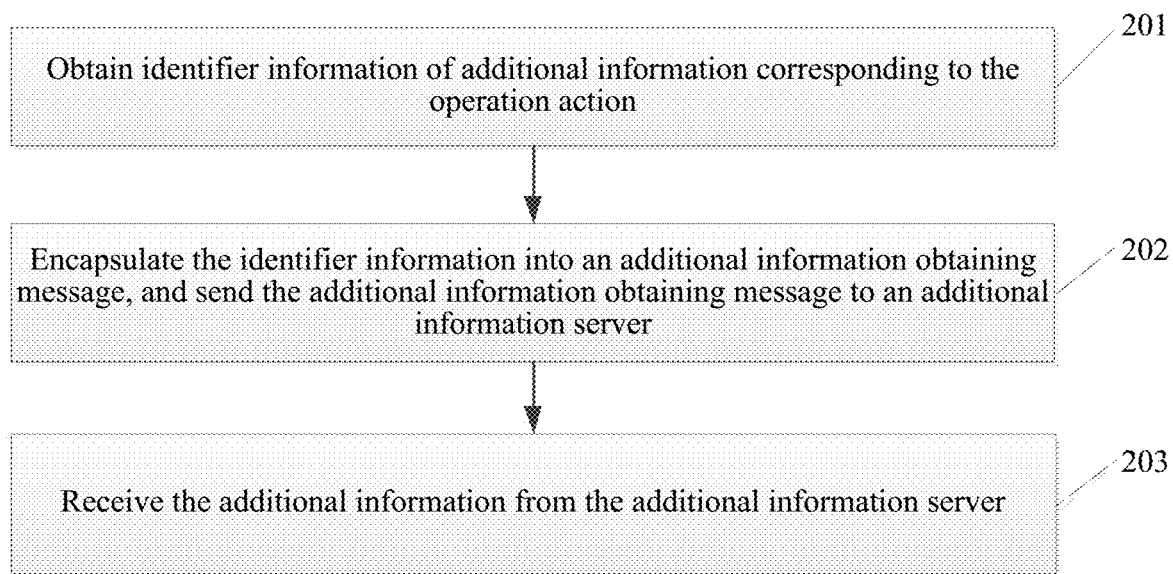
FIG. 2 is a flowchart of obtaining additional information according to an embodiment of the present disclosure.

In an embodiment of the present disclosure, as shown in FIG. 2, the corresponding additional information may be obtained in the following manner.

Step 201: Obtain identifier information of additional information corresponding to the operation action.

The identifier information of the additional information corresponding to the operation action may be obtained according to the pre-stored mapping relationship.

Step 202: Encapsulate the identifier information into an additional information obtaining message, and send the additional information obtaining message to an additional information server.

Accordingly, according to the identifier information of the additional information, the additional information server determines the additional information corresponding to the identifier information, and returns the additional information to the terminal device.

Step 203: Receive the additional information from the additional information server.

In an embodiment of the present disclosure, the additional information is any one of the following information forms: an image, a video, and rich media. Rich media information is information including animation, sound, video, and/or interactive information, and includes one or a combination of the following common forms: streaming media, sound, flash, and the like.

In an embodiment of the present disclosure, the additional information may be extended in an animation. For example, when the operation action performed by the user is the slide operation, the additional information may move onto the user interface at a preset speed along a slide direction of the slide operation.

In an embodiment of the present disclosure, in the foregoing animation form of displaying the additional information by moving the additional information onto the user interface along the slide direction of the slide operation, a group of synthesized images of the first web page and the additional information may be separately generated according to a preset group of synthetic proportions of the first page and the additional information. Each of the group of synthesized images is presented sequentially. For example, the preset group of synthetic proportions of the first web page and the additional information are respectively (75%, 25%), (50%, 50%), (25%, 75%), and (0, 100%). The group of synthesized images are generated according to the group of synthetic proportions, and are sequentially displayed in a preset time period (for example, 1 second). In some embodiments, the proportions between the first page and the additional information are determined based on the current location of the user's finger contact on the touch screen.

When the user's contact stops moving on the touch screen, the proportions between the first page and the additional information also stop changing. In some embodiments, once a preset proportion between the first page and the additional information are reached (e.g., the additional information occupies more screen space than the first page), the device starts a timer which is decremented as long as the proportion remains below the preset proportion, and once the timer is completely run, the information ceases to be displayed, and the second page is displayed in place of the additional information (e.g., occupying a portion of the display) or in place of displayed portions of the first page and the additional information (e.g., occupying the whole display). This feature helps the user to gain more control over how much additional information to view when switching pages. The user is provided with the opportunity to continue to read the first page, while the additional information is presented and while the required time for displaying the additional information is being met, which saves power of the device, because the unwanted additional information is not being displayed idly while the user waits for it to disappear.

In an embodiment of the present disclosure, before the corresponding additional information is obtained, an additional information set pre-loaded by the additional information server is received. Each additional information presentation position corresponds to an additional information set. The additional information set includes at least one piece of additional information corresponding to the additional information presentation position. For example, in the Tencent video application, in a process of switching from a main page to a television drama page, an additional information presentation position for switching from the main page to the television drama page corresponds to an additional information set. The set includes 3 pieces of additional information that are respectively information 1 to 3.

In an embodiment of the present disclosure, the additional information may be further obtained in the following manner. Specifically, identifier information of the additional information presentation position corresponding to the operation action is obtained. The identifier information is encapsulated into the additional information obtaining message, and the additional information obtaining message is sent to the additional information server, so that the additional information server determines, according to a terminal device attribute and/or a user attribute, additional information displayed at the additional information presentation position. An additional information identifier from the additional information server is received. Additional information corresponding to the additional information identifier is selected from the additional information set corresponding to the additional information presentation position. In some embodiments, the identifier information associated with each sub-portion of a plurality of sub-portions (e.g., each image region, or each grid location of a grid that divides the page) of the first page is unique, and depending on the location that is initially touched when the user swipes on the touch-screen to switch pages, or taps on the page to switch pages, the computing device sends different identifier information in the additional information obtaining message, and retrieves different additional information that is more relevant to the user's interest. This increase the likelihood that the more relevant additional information is presented to the user when the user switches between pages, and reduces the amount of idle time that the user spends waiting for the additional information to disappear, and improves the device's utilization.

The example in which additional information is displayed in a process of switching from the main page to the television drama page is still used. An identifier of the additional information presentation position for switching from the main page to the television drama page is obtained, the identifier information is encapsulated into the additional information obtaining message, and the additional information obtaining message is sent to the additional information server. The additional obtaining message may further carry a terminal device identifier and/or user account information. The additional information server obtains a terminal device attribute, for example, region information of the terminal device (for example, a city of the terminal device) according to a corresponding terminal device identifier. The additional information server obtains a user attribute (for example, gender, age, and interest) according to corresponding user account information. Additional information displayed at the additional information presentation position is determined according to the terminal device attribute and/or the user attribute. For example, in the additional information set corresponding to the additional information presentation position, additional information 1 displayed only in Guangdong province is selected for a terminal device in Guangdong province; additional information 2 is pushed to male users; and additional information 3 is pushed to users liking reading. An identifier of selected additional information is sent to the terminal device. The terminal device selects additional information corresponding to the additional information identifier from the additional information set corresponding to the additional information presentation position.

Step 103: Display a second page.

In an embodiment of the present disclosure, when the second page is displayed, a stop prompt button may be further displayed. In response to an operation on the stop prompt button performed by the user, display of the additional information is stopped.

In the foregoing technical solutions, a new additional information display manner is provided, so that display space of a terminal device is more effectively used to display main information and additional information, and information display efficiency is improved. In addition, a user can acquire the additional information within a waiting time of switching a page, thereby improving user experience.

In some embodiments, while displaying the additional information, the device starts to load the second page so that by the time that the additional information is removed from display (e.g., after expiration of the timer), the second page is already rendered underneath the additional information. In some embodiments, when the second page has finished rendering underneath the additional information, the device provides a prompt for the user to swipe on the additional information before the expiration of the timer to see a portion of the second page rendered underneath the additional information (e.g., slide the additional information off the display gradually with the movement of the user's finger), as long as more than a preset proportion of the additional information remains displayed on the touch-screen. This feature allows the user to see the information on the second page, while waiting for the additional information to disappear, thereby reducing the amount of idle time that the user has to spent waiting for the additional information to disappear.

Based on the above, in some embodiments, a method for controlling display of content and additional information (e.g., related information that the user may or may not find of interest, such as advertisements, or a menu of suggested actions, or additional information that may be relevant to the currently displayed information or the requested information) is performed at a device (e.g., a user device such as a mobile device, a tablet device, a personal computer, etc.) having one or more processors, memory, a display, and a touch-sensitive surface (e.g., a touch-screen display, or a touch-pad). The device displays a first page of a set of related content on the display. For example, the first page is a main index page of a media or information portal. The first page includes affordances (e.g., a listing of clickable links or menu items, or tabs for different pages of the media or information portal) for navigating to other pages of the media or information portal (e.g., such as that shown in FIG. 4A). While displaying the first page of the set of related content on the display, the device detects an operation action performed by a user for switching from the first page to a second page of the set of related content. In some embodiments, detecting the operation action includes detecting a swipe input on the touch-screen from the right edge towards the left side of the screen. In some embodiments, detecting the operation action includes detecting a tap input on one of the menu item, or link, or tabs shown on the first page of the set of related content. The operation action triggers a navigation from the first page to a second page of the set of related content (e.g., e.g. the page shown in FIG. 4D). However, during the switching from the first page to the second page, the device also displays additional information that is not on the second page. The display of additional information may be dictated by the owner of the content provider or other related entities, in order to allow the user to access the second page of the set of related content. This is frequently annoying to the user, since the additional information may not be of interest to the user, and it wastes time and battery power to present the additional information at the device. The present disclosure provides a solution which helps to satisfy the requirement for displaying the additional information to the user, but at the same time, allowing the user some control over how the additional information is displayed, and utilize the display time for other purposes, such as continuing to read the first page. In response to detecting the operation action performed by the user: the device slides the first page of the set of related content in a first direction off the display; the device slides additional information that is distinct from the second page of the set of related content onto the display in the first direction, while the first page is sliding off the display; and the device displays the second page of the set of related content after at least a portion of the additional information is displayed on the display for at least a preset threshold amount of time. For example, as shown in FIG. 4B, as the user's finger drags from right to left on the touch-screen, the additional information slides onto the display and covers more and more of the screen area that is displaying a portion of the first page. In some embodiments, the additional information slides over the first page. In some embodiments, the first page is pushed to the right as the additional information is dragged onto the screen. In some embodiments, when the additional information covers more than a preset proportion of the screen (e.g., 50% or 30%, or when certain preset keywords or logo or other preset content becomes fully visible on the display), a timer is started to countdown the present threshold amount of time that the additional information needs to be displayed in order to satisfy the requirement of the content provider or advertiser. Once that timer finishes the countdown, the second page can be displayed, e.g., either automatically without further input, or when the user clicks on an affordance to close the additional information page.

In some embodiments, in response to detecting the operation action performed by the user: the device obtains identifier information of the additional information corresponding to the operation action. In some embodiments, the identifier information is selected by the device based on the location of the initial touch, or the identifier of the second page, or other data related to the user's input or the user's navigation history. The device encapsulates the identifier information into an additional information obtaining message (e.g., an HTTP request to the server providing the additional information). The device sends the additional information obtaining message to an additional information server, so that the additional information server determines the additional information corresponding to the identifier information. The device receives the additional information from the additional information server with a specification of the preset threshold amount of time for which the additional information is required to be displayed at the device. In some embodiments, the device also sends an indicator with the additional information obtaining message to indicate to the additional information server that the device allows the countdown to be begin before full display of the additional information is achieved. In some embodiments, the indicator causes the additional information server to adjust the preset threshold amount of time for the device (e.g., increase the preset threshold amount of time from 5 seconds (e.g., used for devices that do not have the capability described herein) to 7 seconds). In some embodiments, the indicator causes the additional information server to send the additional information in a different display format (e.g., with more concentrated information in the initially displayed portion of the additional information page) from the regular display format of the additional information. In some embodiments, the additional information server sends back a rejection of the request, and require that the additional information be displayed in full before the countdown can be started. In some embodiments, in response to the rejection of the additional information server, the device displays the additional information, and starts the countdown until the additional information is fully displayed on the screen, and displays the second page after the countdown is completed.

In some embodiments, in accordance with a determination that more than a preset proportion, less than all, of the additional information has been slid onto the display, starting a timer for a countdown of the preset threshold amount of time. In some embodiments, the timer is displayed over the visible portion of the additional information page, so that the user is aware that the requirement for displaying the additional information has been met or not. In some embodiments, the user can hold the finger contact midway on the touch-screen, and continue to read the content from the first page that is visible on the screen, while the timer continues the countdown with just a portion of the additional information visible on the display. Once the countdown is over, the user can lift his/her finger, and read the content on the second page after it is displayed on the screen. This gives the user more control over the content navigation on the device, and the utilization of the time and power consumption on the device.

In some embodiments, the second page of the set of related content is displayed at the end of the countdown, without further input from the user. For example, the user may still have his/her finger on the touch-screen when the countdown is completed, and the device automatically displays the second page to replace the portions of the first page and the additional information on the screen, without any additional input from the user. In some embodiments, if the user lift-up his/her finger after the completion of the countdown, the additional information slides fully onto the display, and then slides off immediately to display the second page. In such embodiment, the provider of the additional information reaps the benefit of full display of the additional information at least momentarily, and the user is not bothered by such display as it is very brief.

In some embodiments, the device displays an affordance for removing the additional information at the end of the countdown. For example, in some embodiments, at the end of the countdown, display of the additional information (e.g., the additional information slides onto the display in full and an affordance for closing it is displayed) is maintained, until the affordance for closing the additional information is activated by the user. In some embodiments, the affordance is not displayed, and the additional information is removed in response to a flick or quick swipe input across it, to reveal the second page underneath.

In some embodiments, the operation action performed by the user includes a drag input on the first page in the first direction (e.g., leftward, or upward), followed by a drag input on the first page (e.g., rightward, or downward) in a second direction opposite the first direction. In response to detecting the drag input in the second direction, sliding the additional information off the display in the second direction in accordance with the drag input in the second direction. For example, the user can adjust the amount of the additional information that is displayed by moving the finger contact back and forth in the first or second directions after the timer has been started. In some embodiments, the device stops the countdown in accordance with a determination that less than the preset proportion of the additional information is visible on the display. The device continues the countdown when the proportion of the additional information that is visible increases above the preset proportion again, in response to movement of the user's finger contact.

In some embodiments, the operation action performed by the user includes a drag input on the first page in the first direction, followed by a drag input on the first page in a second direction opposite the first direction. In some embodiments, in response to detecting the drag input in the second direction, the device slides the additional information off the display in the second direction in accordance with the drag input in the second direction; and the device continues the countdown irrespective of a proportion of the additional information that is visible on the display, after the countdown has been started. In such embodiments, the user is allowed to trigger the countdown by moving the additional information onto the display by a sufficient amount, and then move it off the display by and large to continue reading the content on the first page, until the countdown is over.

Other details of the method are described with respect to other embodiments described herein, and are not repeated here in the interest of brevity.

The foregoing describes an information presentation method provided in the embodiments of the present disclosure. The following describes the apparatus and the system in the embodiments of the present disclosure with reference to accompanying drawings.

FIG. 3 is a schematic structural diagram of a terminal device according to an embodiment of the present disclosure. As shown in FIG. 3, the server 300 includes the following modules:

a receiving module 301, configured to receive, when a first page is presented on an application client run on the terminal device, an operation action of switching from the first page to a second page performed by a user;

an obtaining module 302, configured to obtain corresponding additional information in response to the received operation action; and a display module 303, configured to display the additional information and display the second page.

In an embodiment of the present disclosure, the obtaining module 302 includes:

an obtaining unit, configured to obtain identifier information of additional information corresponding to the operation action;

an encapsulating unit, configured to encapsulate the identifier information into an additional information obtaining message;

a sending unit, configured to send the additional information obtaining message to an additional information server, so that the additional information server determines the additional information corresponding to the identifier information; and a receiving unit, configured to receive the additional information from the additional information server.

In an embodiment of the present disclosure, the receiving module 301 is further configured to receive an additional information set pre-loaded by an additional information server. Each additional information presentation position corresponds to an additional information set, and the additional information set includes at least one piece of additional information corresponding to the additional information presentation position.

In an embodiment of the present disclosure, the obtaining module 302 includes:

an obtaining unit, configured to obtain identifier information of an additional information presentation position corresponding to the operation action;

an encapsulating unit, configured to encapsulate the identifier information into an additional information obtaining message;

a sending unit, configured to send the additional information obtaining message to the additional information server, so that the additional information server determines, according to a terminal device attribute and/or a user attribute, additional information presented at the additional information presentation position;

a receiving unit, configured to receive the additional information from the additional information server; and a selection unit, configured to select, from the additional information set corresponding to the additional information presentation position, additional information corresponding to the additional information identifier.

In an embodiment of the present disclosure, the additional information is any one of the following information forms: an image, a video, and rich media.

In an embodiment of the present disclosure, the display module 303 is configured to display the additional information in a animation form.

In an embodiment of the present disclosure, the display module 303 is configured to: separately generate a group of synthesized images of the first web page and the additional information according to a preset group of synthetic proportions of the first page and the additional information; and sequentially display each of the group of synthesized images.

In an embodiment of the present disclosure, the display module 303 is configured to: when the received operation action is a preset operation action, display the additional information in a animation form.

In an embodiment of the present disclosure, the operation action includes at least one of the following operations:

a sliding operation on a touchscreen of the terminal device;

an operation of tapping, on a screen of the terminal device, a tag corresponding to the second page;

an operation of dragging, on a screen of the terminal device, a tag corresponding to the second page; or a gesture operation sensed by a gravity accelerometer or a gyroscope of the terminal device.

In an embodiment of the present disclosure, the display module 303 is further configured to display a stop prompt button, and the terminal device further includes:

a display stopping module 304, configured to stop presentation of the additional information in response to an operation of the user on the prompt off button.

The modules 301 to 304 may be instruction modules stored in a memory 310 of the terminal device 300, and the instruction modules include a processor executable instruction. When a processor 311 of the terminal device 300 executes instructions of the modules 301 to 304, the functions of the modules 301 to 304 can be implemented.

Figure 4C:
Figure 4D:
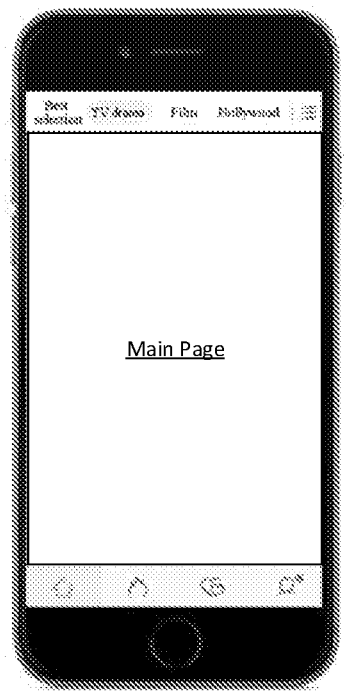
Figure 5A:
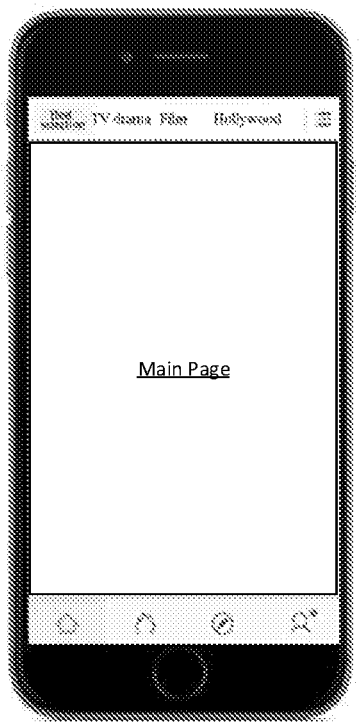
FIG. 5A to 5D are schematic diagrams of displaying additional information according to an embodiment of the present disclosure.
Figure 5B:
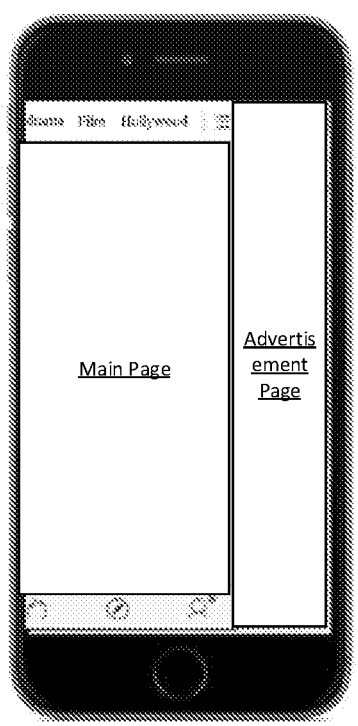
Figure 5C:
Figure 5D:
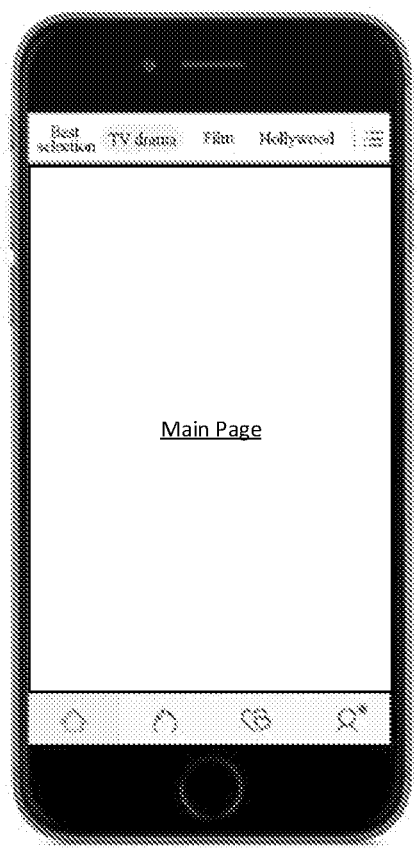

The following describes an example of a specific application scenario of an information presentation method and a terminal device provided in the present disclosure. In an application scenario, on a main page (as shown in FIG. 4A) of a video application client, a user performs a slide operation of switching from the main page to a television drama page, and displays slide full screen advertisements. Specifically, as shown in FIG. 4B and FIG. 4C, advertisement images move along a direction of the slide operation at a preset speed in a animation form. Then, the television drama page is displayed (as shown in FIG. 4D). In another application scenario, on a main page (as shown in FIG. 5A) of a video client, a user performs an operation of clicking a page tag of a television drama, to move advertisement images (as shown in FIG. 5B and FIG. 5C) in a animation form. If the user clicks the display stop prompt button (an icon at the upper left corner as shown in FIG. 5C), advertisement image display is stopped. Then, the television drama page is displayed (as shown in FIG. 5D).

In addition, functional modules in the embodiments of the present disclosure may be integrated into one processing unit, or each of the modules may exist alone physically, or two or more modules may be integrated into one unit. The integrated unit may be implemented in a form of hardware, or may be implemented in a form of a software functional unit. The functional modules in the embodiments may be located on one terminal or network node, or may be distributed on multiple terminals or network nodes.

In addition, each embodiment of the present disclosure may be implemented by a data processing program executed by a data processing device such as a computer. Apparently, the data processing program constitutes the present disclosure. In addition, generally, a data processing program stored in a storage medium is directly read from the storage medium for execution or the program is installed on or replicated to a storage device (such as a hard disk or memory) of a data processing device for execution. Therefore, such a storage medium also constitutes the present disclosure. The storage medium may use any type of recording manner, such as a paper storage medium (such as a paper tape), a magnetic storage medium (such as a soft disk, a hard disk, or a flash memory), an optical storage medium (such as a CD-ROM), or a magneto-optical storage medium (such as an MO).

Therefore, the present disclosure further provides a storage medium, which stores a data processing program. The data processing program is used for executing any embodiment of the foregoing method of the present disclosure.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present disclosure, but are not intended to limit the present disclosure. Any modification, equivalent replacement, or improvement made without departing from the spirit and principle of the present disclosure should fall within the scope of the present disclosure.

What is claimed is:

1. A method, comprising:
   at a device having one or more processors, memory, a display, and a touch-sensitive surface:
   displaying a first page of a set of related content on the display;
   while displaying the first page of the set of related content on the display, detecting an operation action performed by a user in a first direction for switching from the first page to a second page of the set of related content; and
   in response to detecting the operation action performed by the user:
   sliding the first page of the set of related content in a first direction off the display;
   sliding additional information that is distinct from the second page of the set of related content onto the display in the first direction, while the first page is sliding off the display; and
   starting a timer for a countdown of a preset threshold amount of time when more than a preset proportion of the additional information has been slid onto the display;
   in response to detecting a subsequent operation action that is in a second direction opposite to the first direction:
   sliding the additional information off the display and stopping the countdown when less than the preset proportion of the additional information is visible on the display; and
   displaying the second page of the set of related content after the additional information is removed off the display.

2. The method of claim 1, comprising:
   in response to detecting the operation action performed by the user:
   obtaining identifier information of the additional information corresponding to the operation action;
   encapsulating the identifier information into an additional information obtaining message; and
   sending the additional information obtaining message to an additional information server, so that the additional information server determines the additional information corresponding to the identifier information; and
   receiving the additional information from the additional information server with a specification of the preset threshold amount of time for which the additional information is required to be displayed at the device.

3. The method of claim 1, wherein the second page of the set of related content is displayed at the end of the countdown.

4. The method of claim 1, including:
displaying an affordance for removing the additional information at the end of the countdown.

5. The method of claim 1, further comprising:
in response to detecting the subsequent operation action, sliding the additional information off the display in the second direction in accordance with the subsequent operation action; and
continuing the countdown irrespective of a proportion of the additional information that is visible on the display, after the countdown has been started.

6. A computing device, comprising:
one or more processors;
memory;
a display; and
a plurality of instructions stored in the memory that, when executed by the one or more processors, cause the one or more processors to perform the following operations:
displaying a first page of a set of related content on the display;
while displaying the first page of the set of related content on the display, detecting an operation action performed by a user in a first direction for switching from the first page to a second page of the set of related content; and
in response to detecting the operation action performed by the user:
sliding the first page of the set of related content in a first direction off the display;
sliding additional information that is distinct from the second page of the set of related content onto the display in the first direction, while the first page is sliding off the display; and
starting a timer for a countdown of a preset threshold amount of time when more than a preset proportion of the additional information has been slid onto the display;
in response to detecting a subsequent operation action that is in a second direction opposite to the first direction:
sliding the additional information off the display and stopping the countdown when less than the preset proportion of the additional information is visible on the display; and
displaying the second page of the set of related content after the additional information is removed off the display.

7. The computing device of claim 6, wherein the operations include:
in response to detecting the operation action performed by the user:
obtaining identifier information of the additional information corresponding to the operation action;
encapsulating the identifier information into an additional information obtaining message;
sending the additional information obtaining message to an additional information server, so that the additional information server determines the additional information corresponding to the identifier information; and
receiving the additional information from the additional information server with a specification of the preset threshold amount of time for which the additional information is required to be displayed at the device.

8. The computing device of claim 6, wherein the second page of the set of related content is displayed at the end of the countdown.

9. The computing device of claim 6, wherein the operations include:
displaying an affordance for removing the additional information at the end of the countdown.

10. The computing device of claim 6, wherein the operations include:
in response to detecting the subsequent operation action, sliding the additional information off the display in the second direction in accordance with the subsequent operation action; and
continuing the countdown irrespective of a proportion of the additional information that is visible on the display, after the countdown has been started.

11. A non-transitory computer-readable storage medium storing a plurality of instructions configured for execution by a computing device having one or more processors and a display, wherein the plurality of instructions cause the computing device to perform the following operations:
displaying a first page of a set of related content on the display;
while displaying the first page of the set of related content on the display, detecting an operation action performed by a user in a first direction for switching from the first page to a second page of the set of related content; and
in response to detecting the operation action performed by the user:
sliding the first page of the set of related content in a first direction off the display;
sliding additional information that is distinct from the second page of the set of related content onto the display in the first direction, while the first page is sliding off the display; and
starting a timer for a countdown of a preset threshold amount of time when more than a preset proportion of the additional information has been slid onto the display;
in response to detecting a subsequent operation action that is in a second direction opposite to the first direction:
sliding the additional information off the display and stopping the countdown when less than the preset proportion of the additional information is visible on the display; and
displaying the second page of the set of related content after the additional information is removed off the display.

12. The non-transitory computer-readable storage medium of claim 11, wherein the operations include:
in response to detecting the operation action performed by the user:
obtaining identifier information of the additional information corresponding to the operation action;
encapsulating the identifier information into an additional information obtaining message;
sending the additional information obtaining message to an additional information server, so that the additional information server determines the additional information corresponding to the identifier information; and
receiving the additional information from the additional information server with a specification of the preset threshold amount of time for which the additional information is required to be displayed at the device.

13. The non-transitory computer-readable storage medium of claim 11, wherein the second page of the set of related content is displayed at the end of the countdown.

14. The non-transitory computer-readable storage medium of claim 11, wherein the operations include:
  displaying an affordance for removing the additional information at the end of the countdown.

15. The non-transitory computer-readable storage medium of claim 11, wherein the operations include:
  in response to detecting the subsequent operation action, sliding the additional information off the display in the second direction in accordance with the subsequent operation action; and
  continuing the countdown irrespective of a proportion of the additional information that is visible on the display, after the countdown has been started.

\* \* \* \* \*